United States Patent

Matijevic et al.

[11] Patent Number: 5,900,223
[45] Date of Patent: May 4, 1999

[54] PROCESS FOR THE SYNTHESIS OF CRYSTALLINE POWDERS OF PEROVSKITE COMPOUNDS

[75] Inventors: Egon Matijevic; Yie-Shein Her, both of Postdam, N.Y.

[73] Assignee: Chon International Co. Ltd., Seoul, Rep. of Korea

[21] Appl. No.: 08/748,719

[22] Filed: Nov. 14, 1996

Related U.S. Application Data

[63] Continuation of application No. 08/299,367, Sep. 4, 1994, abandoned.

[30] Foreign Application Priority Data

Sep. 3, 1993 [IT] Italy .................................. MI93A1903

[51] Int. Cl.⁶ ............................ C01F 17/00; C01F 13/14; C01G 23/00
[52] U.S. Cl. ........................... 423/263; 423/593; 423/598
[58] Field of Search .................... 423/598, 593, 423/263, 71, 179.5, 184, 158, 65, 92, 21.1, 160, 161

[56] References Cited

U.S. PATENT DOCUMENTS

| | | | |
|---|---|---|---|
| 3,963,630 | 6/1976 | Yonezawa et al. | 423/598 |
| 4,061,583 | 12/1977 | Murata et al. | 423/598 |
| 4,643,984 | 2/1987 | Abe et al. | 423/598 |
| 4,670,243 | 6/1987 | Wilson et al. | 423/598 |
| 4,677,083 | 6/1987 | Uedaira et al. | 423/598 |
| 4,755,373 | 7/1988 | Gherardi et al. | 423/598 |
| 4,764,493 | 8/1988 | Lilley et al. | 423/598 |
| 4,812,300 | 3/1989 | Quinlan et al. | 423/404 |
| 4,816,072 | 3/1989 | Harley et al. | 501/137 |
| 4,832,939 | 5/1989 | Menashi et al. | 423/598 |
| 4,853,199 | 8/1989 | Inoue et al. | 423/593 |
| 4,898,843 | 2/1990 | Matsushita et al. | 423/598 |
| 4,957,888 | 9/1990 | Brand et al. | 423/598 |
| 5,009,876 | 4/1991 | Hennings et al. | 423/598 |
| 5,032,375 | 7/1991 | Lerot et al. | 423/598 |
| 5,087,437 | 2/1992 | Bruno et al. | 423/598 |

FOREIGN PATENT DOCUMENTS

| | | |
|---|---|---|
| 0 150 135 | 7/1985 | European Pat. Off. . |
| 0 304 128 | 2/1989 | European Pat. Off. . |
| WO 90/06291 | 12/1989 | European Pat. Off. . |

OTHER PUBLICATIONS

Derwent Database Abstract 93–148976 for JP–A–5085727, no date.
Derwent Database Abstract 93–121061 for JP–A–5058632, no date.
K. Lee et al., Chem. Abstracts, vol. 104, No. 10, Mar. 10, 1986, p. 133, Abstract No. 71112q.
Turevskaya, E.P. et al., Chem. Abstracts, vol. 101, No. 14, Oct. 1, 1984 p. 124, Abstract No. 113237e.

*Primary Examiner*—Steven Bos
*Attorney, Agent, or Firm*—Finnegan, Henderson, Farabow, Garrett & Dunner, L.L.P.

[57] ABSTRACT

A process for the preparation of crystalline perovskite powders consisting essentially of primary particles uniform in nanometer or micrometer size and uniform and near spherical shape and of narrow size distribution, of the general formula $A_x(BO_3)_y$, wherein cation A is at least one metal selected from the group comprising $Li^+$, $Na^+$, $K^+$, $Mg^{2+}$, $Ca^{2+}$, $Sr^{2+}$, $Ba^{2+}$ and $La^{3+}$ and B in the anion $(BO_3)$ is at least one metal selected from the group consisting of $Ti^{4+}$, $Zr^{4+}$, $Sn^{4+}$, $Hf^{4+}$, $Nb^{5+}$ and $Ta^{5+}$, x is equal to the valence of the anion $(BO_3)$ and y is equal to the valence of cation (A), comprising contacting, under stirring, an aqueous solution (I) containing inorganic or organic salts or organometallic compounds of at least one metal A and of at least one metal B, the ratio (A)/(B) being around the stoichiometric value corresponding to the above general formula, with an aqueous basic solution (II) containing an inorganic or organic base in an amount at least above the stoichiometric amount corresponding to the above general formula, preheated to 70°–100° C., and performing the process at temperatures of from 70° to 100° C. while maintaining the reaction mixture at constant $OH^-$ concentration.

8 Claims, 9 Drawing Sheets

PROCESS FOR THE SYNTHESIS OF CRYSTALLINE POWDERS OF PEROVSKITE COMPOUNDS

This is a continuation of application Ser. No. 08/299,367, filed Sep. 4, 1994, now abandoned.

FIELD OF THE INVENTION

The present invention relates to a process for producing crystalline perovskite, $A_x(BO_3)_y$, ceramic powders consisting of submicron or nanosized dispersible primary particles of narrow size distributions and uniform, essentially spherical morphology. The powders may contain other secondary ingredients, such as dopants that alter electric properties, on the A and/or B sites. The A cation is selected from the group consisting of lithium, sodium, potassium, magnesium, calcium, strontium, barium, and lanthanum; and B in $BO_3$ is selected from the group consisting of titanium in the oxidation state 4, zirconium in the oxidation state 4, niobium in the oxidation state 5, tantalum in the oxidation state 5, tin in the oxidation state 4, and hafnium in the oxidation state 4. The powders may also contain other additives, such as binders, to enhance their sinterability and other properties. The powders have great usefulness in many applications including dielectric, piezoelectric, electrooptic, thermal sensors, and other ceramic industries.

DESCRIPTION OF THE PRIOR ART

The perovskite typified by $BaTiO_3$ has a cubic structure when treated above 135° C. Its lattice consists of a regular array of oxygen ions at the corners, a small tetravalent titanium ion in the center, and big divalent barium ions located at the face centers. The perovskite structure is distorted at low temperatures, where it exhibits tetragonal, orthorhombic, or rhombohedral symmetry. The transition temperature at which the crystal structure transforms from the distorted phase to the cubic phase is called the Curie temperature. Ferroelectric behaviour is caused by the shift in the position of the central cation, i.e., Ti ion in $BaTiO_3$, which results in a displacement of the centers of positive and negative charges within the lattice and generates a spontaneous polarization. The electric properties of perovskites are significantly affected by this ferroelectric behaviour which contributes to useful dielectric, piezoelectric, and electrooptic properties.

In recent years, electronic devices have become much smaller in size and higher in performance than ever before. This trend is also true in ferroelectric ceramics produced from the perovskite compounds. Intensive investigations have been made to improve the process for producing dielectric ceramics, such as molding and sintering methods. However, it seems necessary to improve the properties of the starting powders of perovskite compounds, in addition to the processes for the production of ceramic dielectrics, in order to obtain advanced superior products. In particular, pure perovskite powders consisting of uniform submicrometer particles having high crystallinity are desirable for good sinterability, dense packing, fine grained microstructure in sintered bodies, and high dielectric constant.

Perovskite compounds are usually produced by mixing a carbonate or an oxide of at least one element selected from the group consisting of Mg, Ca, Sr, and Ba (A group elements), with an oxide of at least one element selected from the group consisting of Ti, Zr, Nb, Hf, and Sn (B group elements), calcining the mixture at temperatures not less than 1000° C., wet pulverizing, filtering and then drying the product. According to this method, the powders generated by calcination aggregate to cakes which are difficult to be pulverized to fine particles smaller than 1 μm even by wet pulverization using a trommel. In addition, the particles are irregular in shape. Therefore, conventional powders usually have to be sintered at temperatures of 1350° C. or higher to produce dielectric ceramics having sufficient dielectric properties suitable for practical use. Another disadvantage of this method is the need for high melting temperatures and, hence, an expensive noble metal e.g. Pd, as an internal electrode material. Furthermore, the grain sizes in sintered bodies are usually in the range of 5 to 10 μm, which is far from the optimal grain size of 0.5 to 2 μm for high dielectric constant and volume efficiency. Worst of all, the batch-to-batch variation-in this solid state reaction process makes the quality of the product unpredictable.

Recent efforts in the preparation of perovskite compounds have been focused on liquid phase techniques, since solid state reaction described above could not yield uniform and small particles. Thus, according to U.S. Pat. No. 5,032,375, submicron barium titanate cystalline powder, polydispersed and having angular morphology, is obtained by first precipitating an amorphous powder by hydrolysis of titanium alcoholate in the presence of barium oxide, barium hydroxide, or barium alcoholate and an acid organic compound, then heating the powder under a stream of a gas to achieve crystallization.

According to U.S. Pat. No. 5,009,876, barium titanate is produced by adding an aqueous solution of barium chloride to an aqueous solution of oxalic acid and titanium oxychloride at 20–60° C. under stirring, to precipitate barium titanyl oxalate which is then calcined at 960–1200° C.

According to U.S. Pat. No. 4,832,939, submicron barium titanate based powders having narrow size distributions are produced by heating up to 200° C. an aqueous slurry of PbO and/or $Ca(OH)_2$ with an excess of $Ti(OH)_4$, and after the addition of a solution of $Ba(OH)_2$, the slurry is heated up to 225° C. to precipitate the perovskite compounds.

It was also reported in U.S. Pat. No. 4,643,984 that perovskite compounds with the general formula $ABO_3$ could be obtained using a three step procedure. The first step involved subjecting a mixture of A and B hydroxides to hydrothermal reaction in aqueous media. Next, an insolubilizing (precipitating) agent, such as carbon dioxide, was added to the reaction mixture in order to precipitate unreacted A element materials to adjust the A to B stoichiometry. This step was necessary due to the soluble nature of the A elements including lead, strontium, calcium, barium, and magnesium, under the conditions of the hydrothermal treatment. The mixture formed after the second step contained both a B-rich crystalline oxide phase, formed during the hydrothermal reaction and an A-rich non-crystalline, non-oxide phase, formed during the second step. Alternatively the product slurry of the hydrothermal reaction was first filtered and washed, and then added to an aqueous medium containing the supplemental A elements. The product stoichiometry could further be adjusted by adding an insolubilizing agent. The final step was to filter and wash the product to the desired A to B atomic ratio. This process was demonstrated in the preparation of compound containing the A elements listed above and the B elements including titanium, zirconium, hafnium, and tin.

Several investigators have reported similar processes for producing perovskite compounds. The salts (e.g. carbonates) or in some cases hydroxides, of many of the A and B constituents are combined in an aqueous mixture. The mixture is adjusted to a basic pH by adding alkaline metal hydroxides or ammonium hydroxide. This mixture is then reacted under hydrothermal conditions to produce crystalline perovskite compounds. The product slurry is cooled, filtered, and washed with water to remove impurities remaining from the salts and the pH adjusting chemicals. Examples of processes which employ these procedures have been reported by Fuji Titan Kogyo Co. in the Japanese patent JP61031345, by Yonezawa, et al in the U.S. Pat. No. 3,963,630, and by Battelle Memorial Institute in the international patent WO 90/06291.

The above prior art processes have many disadvantages in that they involve several reaction steps, require calcination or reaction under high temperature and pressure to obtain crystalline powders, and need complicated post-treatment on the product powders in order to adjust the stoichiometry.

The problem to be solved in the present invention resides in a process having the following essential features:

to prepare uniform crystalline, essentially spherical particles during the reaction process without using any calcination process before sintering;

to have available a simple one step reaction process having high production rate and at the same time reducing operation costs and units or steps;

a process working at low temperatures and pressures and easily controlled reaction;

a process giving high yields and high conversion of the starting material to the end product;

very high rate (kinetic) of the reaction;

a water-based system with no organic solvent involved, in order to eliminate pollution problems;

efficient washing procedure requiring minimum amount of water;

no post-treatment on the powders obtained in the process for adjusting the stoichiometry;

perfect reproducibility;

powders having superior dielectric, sintering and microstructure properties with respect to the prior art powders;

excellent dispersibility of the powder during the tape-casting process;

increased uniformity of the grain sizes in the sintered product;

small grain sizes to increase volume efficiency;

control of the dielectric constant vs. temperature, curve, to be either broad for the MLC capacitor application, or extremely sharp for the thermal sensor application.

The solution to the above problem has been unexpectedly and surprisingly found by the process of the present invention to be described below.

In particular, it has been found that the powders of the present invention have shown a high dielectric constant, which increases the volume efficiency of the product; they have a low sintering temperature, which reduces the cost of the electrode materials; they show small grain size, which increases the volume efficiency of the product.

SUMMARY OF THE INVENTION

We have now found a simple, single step, highly reproducible process, which operates at low temperatures and permits direct production, in very short time, with high yield, of finely dispersed crystalline perovskite powders uniform in nanometer or micrometer size, uniform and near spherical shape, without the need for calcination. On sintering these powders produce solids of near theoretical density with fine uniform grains of the order of 1–2 $\mu$m. Thus, the object of the present invention is a process for the preparation of crystalline perovskite compounds of predetermined average particle sizes and compositions, having improved electric properties, having a general formula, $A_x(BO_3)_y$, where A is primarily of the group lithium, sodium, potassium, strontium, and barium and B is primarily of the group titanium in the oxidation state 4, and niobium in the oxidation state 5, and wherein the A and/or B sites may have dopants that provide superior electric properties. The dopants D that are used in partial substitution of elements in group A may include calcium, magnesium, strontium, lanthanum and like, and the dopants D' that are used in partial substitution of elements in group B include zirconium in the oxidation state 4, tantalum in the oxidation state 5, hafnium in the oxidation state 4 and the like. The powders so prepared have controlled particle size distributions and have reduced sintering temperatures.

In this process, two techniques are used to achieve the said properties of materials. While the same chemicals are used, one of the techniques is based on the so called controlled double jet precipitation (CDJP) and the other is described as the "gel-sol" precipitation, not to be confused with the "sol-gel" technique common in ceramics.

Sol-gel processes do not produce bulk powders; they yield gels instead. A crystalline phase appears only after heat treatment of such gels at elevated temperatures, which often results in cracks due to extensive shrinkage. Alternately, lumps of glass-like material may form.

In principle, the processes of the present invention involve the introduction of an aqueous solution of mixed inorganic metal salts or organometallic compounds, containing (a) one or more elements selected from the group consisting of lithium, sodium, potassium, magnesium, calcium, strontium, barium, and lanthanum and (b) one or more elements selected from the group consisting of titanium, zirconium, niobium, tin, hafnium and tantalum, into a stirred, heated aqueous solution of inorganic or organic base containing at least 0.4 mol dm$^{-3}$ OH$^-$ ions, which leads immediately to the precipitation of solid products. Depending on the reaction conditions, additional base solution may be added to the reacting mixture during the process, as required to maintain a constant concentration of OH$^-$. The reaction temperature needs not exceed 100° C., and the process is extremely fast and quantitative. Crystalline perovskite compounds are produced in a few minutes, which are then purified by washing with water, and dried to the final products. Therefore, when barium and titanium are selected as the primary components, the perovskite has the general formula of $BaTiO_3$, wherein the dopant for Ba and/or Ti sites may have values between 0 to 50% by mole.

DETAILED DESCRIPTION OF THE INVENTION

The present invention is a process for the preparation of crystalline perovskite powders consisting essentially of primary particles uniform in nanometer or micrometer size, uniform and near spherical shape, of narrow size distribution, of the general formula $A_x(BO_3)_y$, wherein cation (A) is at least one metal selected from the group comprising Li$^+$, Na$^+$, K$^+$, Mg$^{2+}$, Ca$^{2+}$, Sr$^{2+}$, Ba$^{2+}$ and La$^{3+}$ and (B) in the anion (BO$_3$) as designated in the above formula is at least one metal selected from the group consisting of Ti$^{4+}$, Zr$^{4+}$, Sn$^{4+}$, Hf$^{4+}$, Nb$^{5+}$ and Ta$^{5+}$, x is equal to the valence of the anion (BO$_3$) and y is equal to the valence of cation (A), comprising contacting, under stirring, an aqueous solution (I) containing inorganic or organic salts or organometallic compounds of at least one metal (A) above defined, and of at least one metal (B) as defined, the ratio (A)/(B) being around the stoichiometric value corresponding to the above general formula, with an aqueous basic solution (II) containing an inorganic or organic base in an amount at least above the stoichiometric amount corresponding to the above general formula, preheated to 70°–100° C., and performing the process at temperatures of from 70° to 100° C. while maintaining the reaction mixture at about constant $OH^-$ concentration, preferably about pH 14.

The salts can be selected from halides, nitrates, acetates, perchlorates, oxalates, preferably chlorides, or organometallic compounds, such as alkoxides. The base can be selected from strong bases such as alkaline and alkaline-earth metal hydroxides and ammonium hydroxide, preferably NaOH or KOH.

The total concentration of the metal ions in solution (I) can range within wide limits, advantageously from 0.1 to 2.0 mol dm$^{-3}$, preferably from 0.5 to 1.2 mol dm$^{-3}$. The base concentration in solution (II) can range within wide limits, generally from 0.4 to 6 mol dm$^{-3}$, provided that the pH of the reaction mixture is maintained at about a constant level, preferably around 14.

In general the molar ratio of the metal ions in group (A) to those in group (B) in solution ranges from about 0.8 to 1.2.

The reaction mixture can be maintained at a pH of about 14 by addition of a concentrated base solution during the reaction as needed.

The processes of the present invention can be performed by two different techniques, a "controlled double jet precipitation" referred to herein as CDJP, and a "gel-sol" process.

According to the CDJP, the aqueous solution (I) and aqueous solution (II) are separately and simultaneously injected, using metering pumps, into a CDJP reactor containing a stirred aqueous base solution, preferably of pH of about 14, preheated to 70–100° C. The flow rate of solution (I) is maintained constant, while the base solution (II) is injected at such a flow rate, depending on the flow rate of solution (I), that the pH of the reaction mixture is maintained constant at about 14 and monitored by a pH meter, using temperature sensitive glass electrode, during the entire operation performed at 70–100° C. The reaction temperature is kept constant by a temperature controlled circulator. The reaction mixture is kept stirred, preferably from about 400 to 700 rpm with a propeller during the entire operation.

In the CDJP method, the flow rates of the reactant solutions (I) and (II) can be varied within a wide range from 5 to 40 cm$^3$ min$^{-1}$, depending on the concentrations of the reactants in the stock solutions and the pH at which the reaction mixture has to be maintained during the reaction.

In the preparation of perovskites by the controlled double-jet precipitation (CDJP) technique, as described, e.g. in case of preparation of Sr-doped BaTiO$_3$, two stock solutions, i.e. (1) (II) NaOH solution and (2) (I) a solution containing all the necessary metal salts, for example, BaCl$_2$, SrCl$_2$, and TiCl$_4$, are introduced into the reactor simultaneously to form particles, as described e.g. in Example 17 below.

A variation of the double-jet precipitation (CDJP) is the controlled triple-jet precipitation (CTJP) technique.

According to CTJP, three stock solutions, instead of two as in the CDJP, are separately injected into the reactor. Thus, in addition to solutions (I) and (II) there is used a solution (III) containing a salt of the same element B contained in solution (I) and a salt of a dopant D selected from $Ca^{2+}$, $Mg^{2+}$, $Sr^{2+}$, and $La^{3+}$ or a salt of the same element A contained in solution (I) and a salt of a dopant $D^1$ selected from $Zr^{4+}$, $Sn^{4+}$, $Hf^{4+}$, $Nb^{5+}$, and $Ta^{5+}$, D being different from A, and D' from B.

The three solutions (I), (II), and (III) can be simultaneously injected at constant flow rates into the reactor (method a) or combinations of two are injected sequentially at a given time, i.e. by first simultaneously injecting solutions (I) and (II), followed by simultaneous injection of solutions (II) and (III) (method b), or first simultaneously injecting solutions (II) and (III), followed by simultaneous injection of solutions (I) and (II) (method c).

In case of preparation of Sr-doped BaTiO$_3$, three stock solutions, instead of two (as in the CDJP), are introduced into the reactor. These solutions are, for example, (1) a NaOH solution, (2) a solution containing BaCl$_2$ and TiCl$_4$, and (3) a solution containing SrCl$_2$ and TiCl$_4$. These three solutions can be introduced as follows: Method (a) all three are introduced simultaneously by jets at constant flow rates; Method (b) combinations of two are added at a given time in sequence, i.e. first solutions (1) (NaOH) and (2) are introduced simultaneously at constant flow rates for a desired period of time, aged, e.g., for 5 min., followed by simultaneous introduction of solutions (1) (NaOH) and (3) for some time, and finally aged, e.g., for 5 min., or Method (c) the same procedure as in (b) except first are introduced solutions (1) and (3), followed by solutions (1) and (2). The specific examples using the CTJP technique are given below.

In general the sharp curve of dielectric constant vs. temperature has been obtained from the powders produced by the CDJP technique (see e.g. FIG. 9), in case of Sr-doped BaTiO$_3$.

Extremely sharp curves, such as the one in FIG. 9, are difficult to obtain from the powders produced by other existing processes.

The dielectric properties can be altered by the kind and concentration of the dopant. For example the broad curves are obtained with the use of Ca as dopants.

According to the "gel-sol process", the aqueous solution (I) is introduced into a reactor containing a stirred aqueous solution, preheated to 70–100° C., containing a base in such a concentration as to maintain a constant base pH, preferably of about 14, in the reaction mixture during the reaction performed at 70–100° C.

The "gel-sol process" can also be carried out on a continuous basis by feeding solutions (I) and (II), preferably preheated to 70–100° C. , at constant flow rates, into a static mixer tubular reactor, kept at a reaction temperature of 70–100° C., with reaction time ranging from 10 to 30 min, the base concentration and the flow rate of solution (II) being such as t6 maintain constant pH, preferably of about 14, of the reaction mixture. The product suspension can then be collected continuously at the end of the tubular reactor, and subsequently subjected to filtration or centrifugation, washing, and drying.

Another aspect of the present invention is the production of doped perovskites. To achieve doped solids the stock solution (I) also contains desired, usually minor, amount of at least one doping metal element. For instance, in the case of barium titanate, part of Ba is substituted with at least one doping element D, where D is selected from Ca, Mg, Sr and La, and/or part of Ti is substituted with at least one doping element $D^1$, where $D^1$ is selected from Zr, Sn, Nb, Ta and Hf.

The doping contents can range from 0 to 50%, preferably from 5 to 25% by mole.

Another advantage of the present invention is that the exact composition and the average size of the resulting particles can be varied, within a reasonable range, by adjusting the concentrations of the stock solutions, the pH of the reaction mixture during the process, the flow rates of the injected solutions, the reaction temperature, and the reaction time. In addition to these operation parameters, the average size can also be controlled by the addition of natural or synthetic polymers or surfactants such as gelatin, dextrans, dextrins, polyvinyl alcohol, polyethylene glycol, and polyvinylpyrrolidone, in amounts varying from 0.01 to 2% by weight based on the reaction mixture.

At the completion of the reaction, the precipitated particles of crystalline perovskite compounds are separated from the mother liquor by decanting and centrifugation, or by filtration, and purified by washing with water and, finally, dried, preferably from 90° to 110° C. Spray or freeze drying can be used, if desired.

The processes of the present invention are rapid, require low temperatures, and the yields are high, substantially quantitative. Crystalline particles of perovskite compounds can be produced in less than 5 min, at temperatures which need not exceed 100° C., without using a pressurized reactor. The processes of the present invention, however, if desired, can also be performed at higher temperatures up to 250° C., by using pressurized reactors.

The solid crystalline particles obtained by the present processes can be sintered to high densities at temperatures 100 to 300° C. below the sintering temperatures of standard ball-milled and calcined powders, to produce ceramics exhibiting uniform microstructures, homogeneous chemical compositions, and high dielectric constants as high as 25,000 depending on the composition.

In order to improve the body integrity of the sintered pellets, it may be useful to incorporate a known binder in the green bodies. The binder may be selected from polyvinyl alcohol, polyvinylbutyral, and polyethylene glycol, in the amount, preferably of 0.5 to 4.0% by weight, in the green pellets.

Barium titanate pellets of 98% theoretical density (6.01 g $cm^{-3}$) were obtained when sintered at 1200° C., and 99 to 100% theoretical density was achieved when sintered at 1250° C. In contrast, the commercial barium titanate powders only sinter to about 85% theoretical density at 1200° C.

The powders obtained by the processes of the present invention were characterized in terms of chemical composition, crystallinity, morphology, and particle size distribution by using the following methods.

Chemical Analysis

The chemical compositions were determined by atomic absorption spectrophotometry, induction coupled plasma (ICP) technique, colorimetry, and gravimetric or titration analyses. For barium titanate powders, approximately one gram of the dry solid was dissolved in 25 $cm^3$ of hot concentrated sulfuric acid, then diluted with cold water and let standing for 12 hours. The resulting white precipitate was separated from the mother liquor by filtration using non-ash filter paper, placed in a crucible, and then burnt at 800° C. for 1 hour. The white powder was weighed as $BaSO_4$. The titanium content was then determined by titration technique. To the filtrate, 30 $cm^3$ of concentrated HCl was added, heated to 75° C., and 3 g of high purity aluminum was admixed until dissolved. After cooling to below 50° C., 5 $cm^3$ of saturated $NH_4SCN$ solution was added as an indicator, and then the entire system was titrated with 0.1 mol $dm^{-3}$ $FeNH_4(SO_4)_2$ solution.

Crystallinity

The crystal structure was determined by X-ray powder diffraction (XRD) analysis with a $CuK\alpha1$ X-ray source was employed for this purpose.

Morphology

The morphology of the powders was elucidated by transmission (TEM) and scanning electron microscopies (SEM).

Particle Size Distribution

The particle size distributions were determined from electron micrographs using a particle size analyzer.

Sintering Conditions

The powders were further sintered and the dielectric constants were determined on the sintered pellets by using the following conditions and methods.

To make a green pellet, about 1 g of powder was placed in a cylindrical die and uniaxially pressed under 25 MPa using a Carver laboratory hydraulic press. The pellet was placed in a latex balloon, the air from which was then evacuated, and the content was isostatically compressed under 340 MPa in the oil chamber of a Fluitron cold isostatic press unit. Finally, the green pellet was removed, weighed, and its dimensions measured using vernier calipers. The resulting green density was calculated according to the weight and dimensions measured, and compared to the theoretical density.

The green pellets were subsequently sintered in a high temperature furnace under air at different temperatures for 60 min using a heating/cooling rate of 8° C. $min^{-1}$. The sintered densities were measured according to the ASTM (C373-55T) standard procedure based on the Archimedes principle.

Dielectric Constant

To determine the dielectric constants, a sintered pellet was coated with gold film on both sides, placed between two parallel copper electrodes, and the capacitances were then evaluated at frequencies of 100 Hz, 1 khz, 10 kHz, and 100 kHz at temperatures ranging from –55 to 145° C. The dielectric constants were calculated from the capacitances so obtained.

The Y5V capacitor as reported below, is characterized by the maximum dielectric constant between 10.000 and 15.000.

The deviation of the dielectric constant at temperatures from –30 to 85° C., from that at 25° C., should fall between –82% and +22%.

The specifications for a Z5U-capacitor (see below) are: the maximum dielectric constant is between 4.000 to 12.000; and the deviation of the dielectric constant at temperatures from 10 to 85° C., from that at 25° C., should fall between –56% and +22%.

The following examples are given for illustration purposes.

EXAMPLE 1
Barium titanate by the CDJP process

An aqueous solution containing a mixture of $BaCl_2$ and $TiCl_4$ and a 6 mol $dm^{-3}$ NaOH solution were simultaneously introduced, at constant flow rates of 12 and 8 $cm^3$ $min^{-1}$, respectively, into a 330 $cm^3$ CDJP reactor containing 100 $cm^3$ stirred 1 mol $dm^{-3}$ NaOH solution preheated at 88° C. The temperature dropped to 83–85° C. and then was maintained constant at 85° C. The total concentration of the $BaCl_2+TiCl_4$ solution was 1 mol $dm^{-3}$, while the molar ratio $[BaCl_2]/[TiCl_4]$ was kept at 1.07. The introduction of the $BaCl_2+TiCl_4$ and NaOH solutions lasted 8 min, subsequently followed by aging at 85° C. under stirring for 3 min.

The precipitation of colloidal crystalline particles of $BaTiO_3$ took place instantaneously. The resulting solid settled rapidly and the supernatant solution was decanted. The so concentrated suspension was then centrifuged at 500 rpm, the remaining supernatant solution was again decanted and the solids were washed twice with boiling deionized water and once with cold deionized water with agitation in an ultrasonic bath. The purified powder was separated by centrifugation and dried at 100° C.

Figure 1:
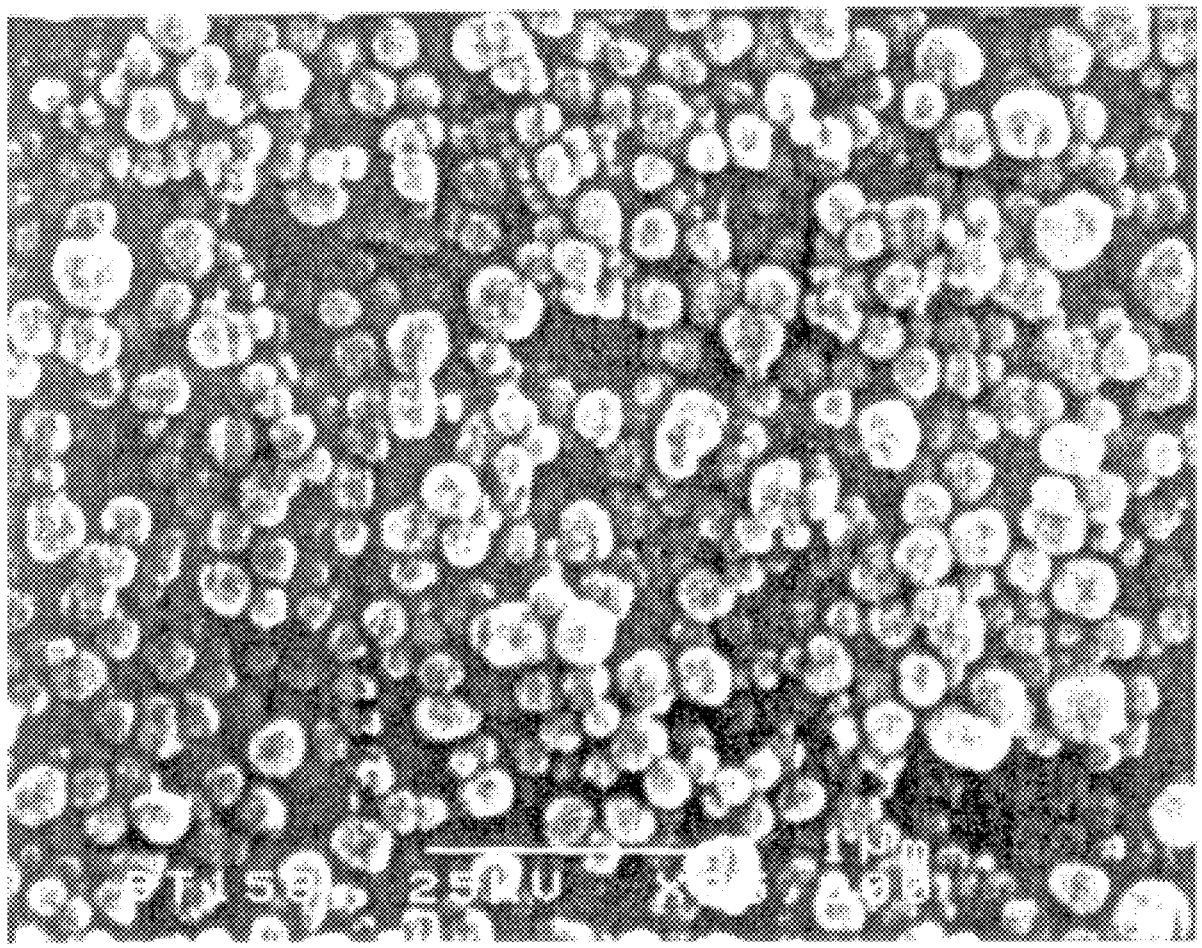
FIG. 1. Scanning electron micrograph (SEM) of the $BaTiO_3$ particles obtained as described in Example 1.
Figure 8:
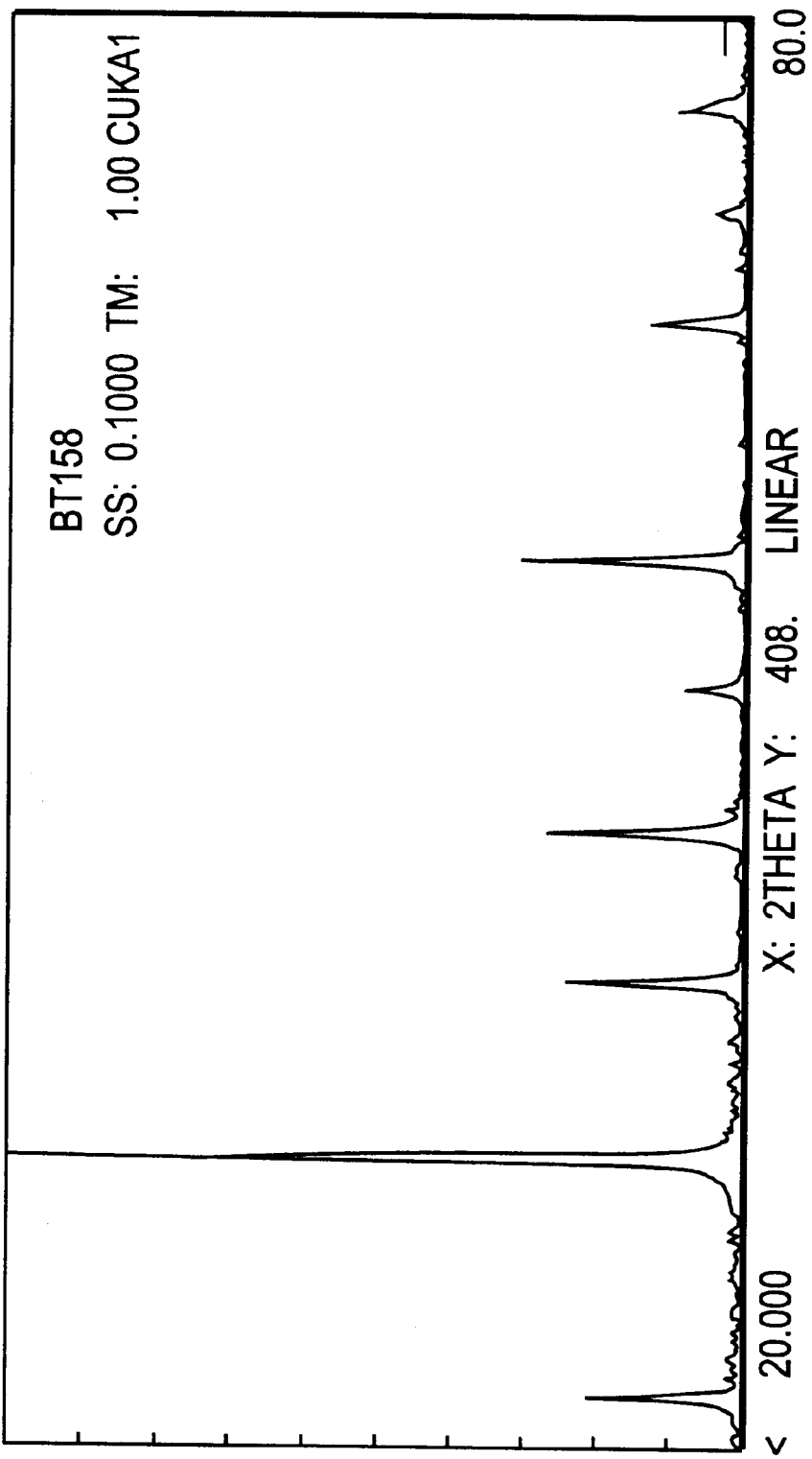
FIG. 8. XRD pattern of the powder of Example 1.

The so obtained powder was proved, by chemical analysis, to be pure barium titanate ($BaTiO_3$) with a molar ratio [Ba]/[Ti] of 1.00 in the solid. The scanning electron micrograph (SEM) in FIG. 1 shows that the particles are substantially spherical with an average size of 0.2 $\mu$m. The X-ray powder diffraction (XRD) pattern (FIG. 8) indicated that the powder to be well crystalline, pure phase $BaTiO_3$. The chemical analysis of the supernatant solution at the completion of the process showed no presence of titanium ions. Thus, the entire initial amount was converted to $BaTiO_3$.

The powder was pressed into pellets and sintered at different temperatures for 1 hour, according to the procedure previously described, and the sintered densities were compared to those of a commercial barium titanate powder (supplied by Chon International Co, Ltd., Seoul, Korea):

| | Sintered densities (% theoretical) | | | |
|---|---|---|---|---|
| Sample | 1100° C. | 1150° C. | 1200° C. | 1250° C. |
| Commercial | 68.5 | 73.9 | 85.7 | 98.9 |
| Prepared according to Example 1 | — | 79.8 | 97.4 | 99.8 |

Figure 2:
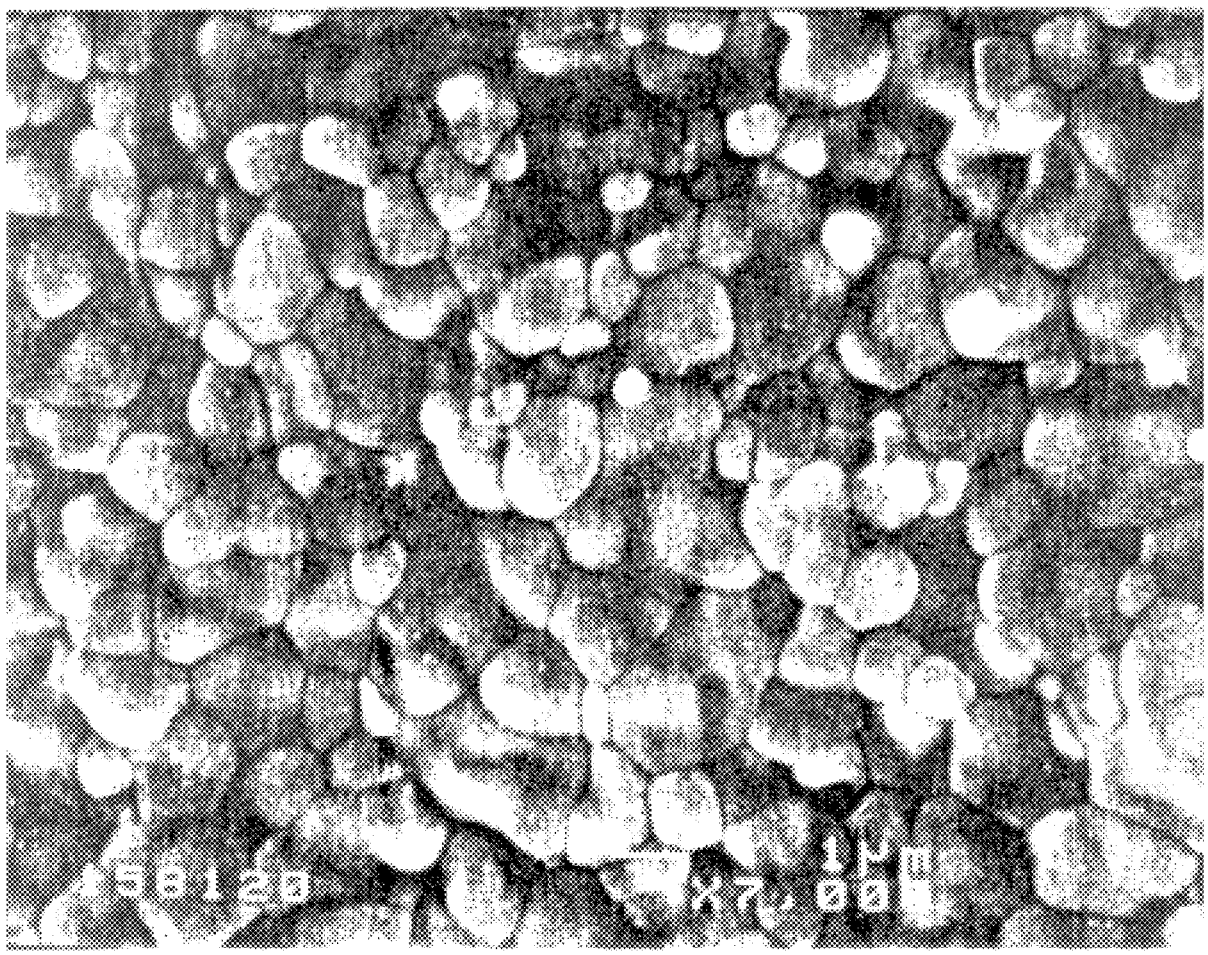
FIG. 2. SEM picture of the microstructure of the pellet containing the powder shown in FIG. 1, sintered at 1200° C. for 1 hour.
Figure 3:
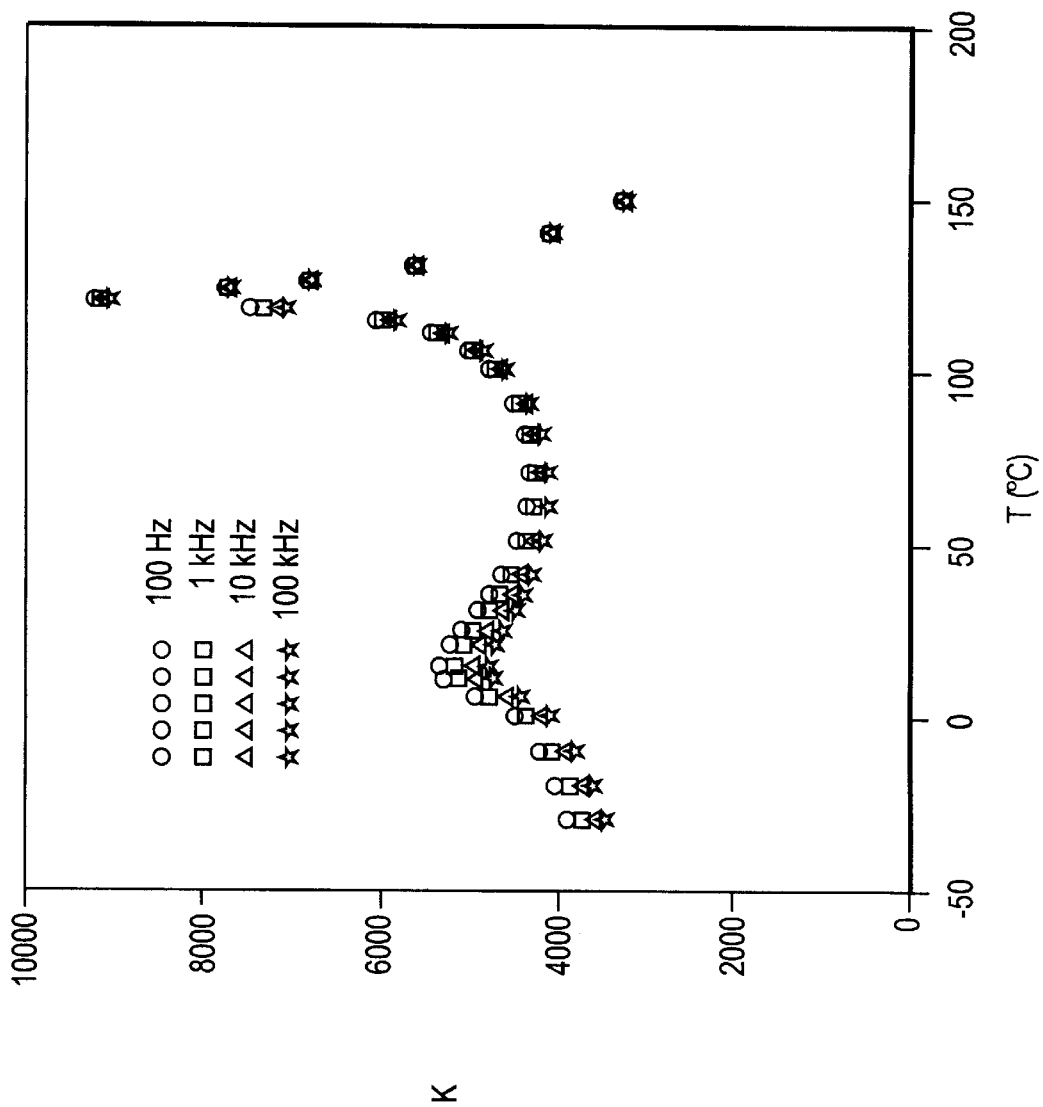
FIG. 3. Plot of the dielectric constant K vs. temperature for the same pellet described in FIG. 2.

FIG. 2 shows the scanning electron micrograph of the microstructure of the pellet, containing the powder produced in this example, sintered at 1200° C. for 1 hour. The grains are small and uniform with an average size of 1.4 $\mu$m. The dielectric constants of the same pellet were measured as a function of temperature, and the results are shown in FIG. 3. The sample has a Curie temperature of 120° C. at which the dielectric constant peaks at 9,200. At 20° C., the sample has a dielectric constant of 5,000, which is superior to any reported values for pure $BaTiO_3$.

EXAMPLE 2
Barium titanate by the CDJP process

A series of CDJP experiments were carried out in a 330 $cm^3$ CDJP reactor to examine the effect of the flow rate of NaOH solution. An aqueous solution containing a mixture of $BaCl_2$ and $TiCl_4$ and a 6 mol $dm^{-3}$ NaOH solution were simultaneously introduced, at constant flow rates, into the CDJP reactor containing 100 $cm^3$ stirred 1 mol $dm^{-3}$. NaOH solution preheated to 88° C. The total concentration of the $BaCl_2+TiCl_4$ solution was 1 mol $dm^{-3}$, while the molar ratio $[BaCl_2]/[TiCl_4]$ was kept at 1.07. The flow rate of the $BaCl_2+TiCl_4$ solution was kept constant at 12 $cm^3$ $min^{-1}$, while the flow rate of the NaOH solution was varied from 5 to 14 $cm^3$ $min^{-1}$. The reaction temperature was kept at 85° C. The introduction of the $BaCl_2+TiCl_4$ and NaOH solutions lasted 8 minutes, subsequently followed by aging at 85° C. under stirring for 3 minutes.

The obtained dispersions, treated as in Example 1, gave powders consisting of particles which were well crystalline and spherical in shape. The particle size increased, from 0.15 to 0.28 $\mu$m, with decreasing flow rate from 14 to 5 $cm^3$ $min^{-1}$.

EXAMPLE 3
Barium titanate by the CDJP process

This example illustrates the effect of increased reaction volume. An aqueous solution containing a mixture of $BaCl_2$ and $TiCl_4$ and a 6 mol $dm^{-3}$ NaOH solution were simultaneously introduced, at constant flow rates of 24 and 16 $cm^3$ $min^{-1}$, respectively, into a 900 $cm^3$ CDJP reactor containing 200 $cm^3$ stirred 1 mol $dm^{-3}$ NaOH solution preheated at 88° C. The temperature dropped to 83–85° C. and then was maintained constant at 85° C. The total concentration of the $BaCl_2+TiCl_4$ solution was 1 mol $dm^{-3}$, while the molar ratio $[BaCl_2]/[TiCl_4]$ was kept at 1.07. The introduction of the $BaCl_2+TiCl_4$ and NaOH solutions lasted 8 min, subsequently followed by aging at 85° C. under stirring for 3 min.

The resulting dispersion was treated the same as in Example 1. Barium titanate particles so obtained had the same characteristics as those in Example 1. This process yielded twice the weight of the solid as compared to Example 1.

EXAMPLE 4
Barium titanate by the CDJP process

The experiment, as described in Example 3, was repeated using the same procedure except that the flow rates of the NaOH and $BaCl_2+TiCl_4$ stock solutions were 24 and 36 $cm^3$ $min^{-1}$, respectively. The so obtained suspension was treated the same as in Example 1. The resulting solid had the same characteristics as that obtained in Example 3, and the weight of the solid produced was three times larger than obtained in Example 1.

EXAMPLE 5
Barium titanate by the CDJP process

This example is offered to show that $BaTiO_3$ particles of different sizes can be obtained by altering the experimental conditions. An aqueous solution containing a mixture of $BaCl_2$ and $TiCl_4$ and a 6 mol $dm^{-3}$ NaOH solution were simultaneously introduced, at constant flow rates of 12 and 8 $cm^3$ $min^{-1}$, respectively, into a 900 $cm^3$ CDJP reactor containing 200 $cm^3$ stirred 1 mol $dm^{-3}$ NaOH solution preheated at 88° C. The temperature dropped to 83–85° C. and then was maintained constant at 85° C. The total concentration of the BaCl$_2$+TiCl$_4$ solution was 1 mol dm$^{-3}$, while the molar ratio [BaCl$_2$]/[TiCl$_4$] was kept at 1.07. The introduction of the BaCl$_2$+TiCl$_4$ and NaOH solutions lasted 30 min, subsequently followed by aging at 85° C. under stirring for 3 min. The final volume of the resulting suspension was 800 cm$^3$.

The so obtained particles were well crystalline and had an average particle size of 0.4 μm.

EXAMPLE 6
Barium titanate by the CDJP process

Another experiment was conducted using the same conditions as in Example 5, except the starting volume of the 1 mol dm$^{-3}$ NaOH solution was reduced to 100 cm$^3$. The average particle size of the resulting solid was 0.3 μm, while the other characteristics were the same as those obtained in Example 5.

EXAMPLE 7
Barium titanate by the CDJP process

This example shows the result when NaOH is substituted by KOH. An aqueous solution containing a mixture of BaCl$_2$ and TiCl$_4$ was introduced, at a constant flow rate of 10 cm$^3$ min$^{-1}$, into a 330 cm$^3$ CDJP reactor containing 100 cm$^3$ stirred 1 mol dm$^{-3}$ KOH solution preheated at 88° C. The total concentration of the BaCl$_2$+TiCl$_4$ solution was 1 mol dm$^{-3}$, while the molar ratio [BaCl$_2$]/[TiCl$_4$] was kept at 1.07. The introduction of the BaCl$_2$+TiCl$_4$ solution lasted 7 minutes, subsequently followed by aging at 85° C. under stirring for 3 minutes. The pH of the reaction mixture was monitored and automatically adjusted by addition of a concentrated KOH solution (6 mol dm$^{-3}$) through a metering pump to keep it constant at a value of 14.

The precipitated solid was purified and dried as previously described in Example 1. The so obtained powder shows the same characteristics as those of the powder obtained according to Example 1.

EXAMPLE 8
Barium titanate by the CDJP process

Example 7 was repeated, but instead of continuously adjusting the pH, which involved a change in the flow rate of the added 6 mol dm$^{-3}$ KOH solution, the KOH solution was introduced into the reaction mixture at a constant flow rate of 8 cm$^3$ min$^{-1}$ and the BaCl$_2$+TiCl$_4$ stock solution at 12 cm$^3$ min$^{-1}$. The so obtained solid showed the same characteristics as the powder produced according to Example 7.

EXAMPLE 9
Barium titanate by the CDJP process

Experiments were conducted according to the procedures described in Example 7, except that the flow rate of the BaCl$_2$+TiCl$_4$ stock solution was varied from 6 to 16.7 cm$^3$ min$^{-1}$. The resulting particles were treated the same as in Example 1.

The results showed that the average particle size depended little on the rate of the addition of the metal salts solution. The characteristics of the solids were the same as those of the powder in Example 7.

EXAMPLE 10
Barium titanate by the CDJP process

The experiments were carried out to investigate the effect of the pH on the particle formation using the conditions described in Example 7. The pH of the reaction mixture was controlled at different values ranging from 13.5 to 14.0.

The results showed that the dispersity of the powders was rather sensitive to the pH. The XRD patterns indicated that the particles were only partially crystalline at pH<13.6 (or equivalent to 0.42 mol dm$^{-3}$ OH$^-$), but had clearly crystalline properties of pure BaTiO$_3$ at pH values higher than 13.6.

EXAMPLE 11
Barium titanate by the CDJP process

The experimental conditions were the same as in Example 7, except that 0.1% by weight of β-cyclodextrin was added in the 100 cm$^3$ of 1 mol dm$^{-3}$ KOH solution in the CDJP reactor. The resulting suspension was treated the same as in Example 1.

Figure 4:
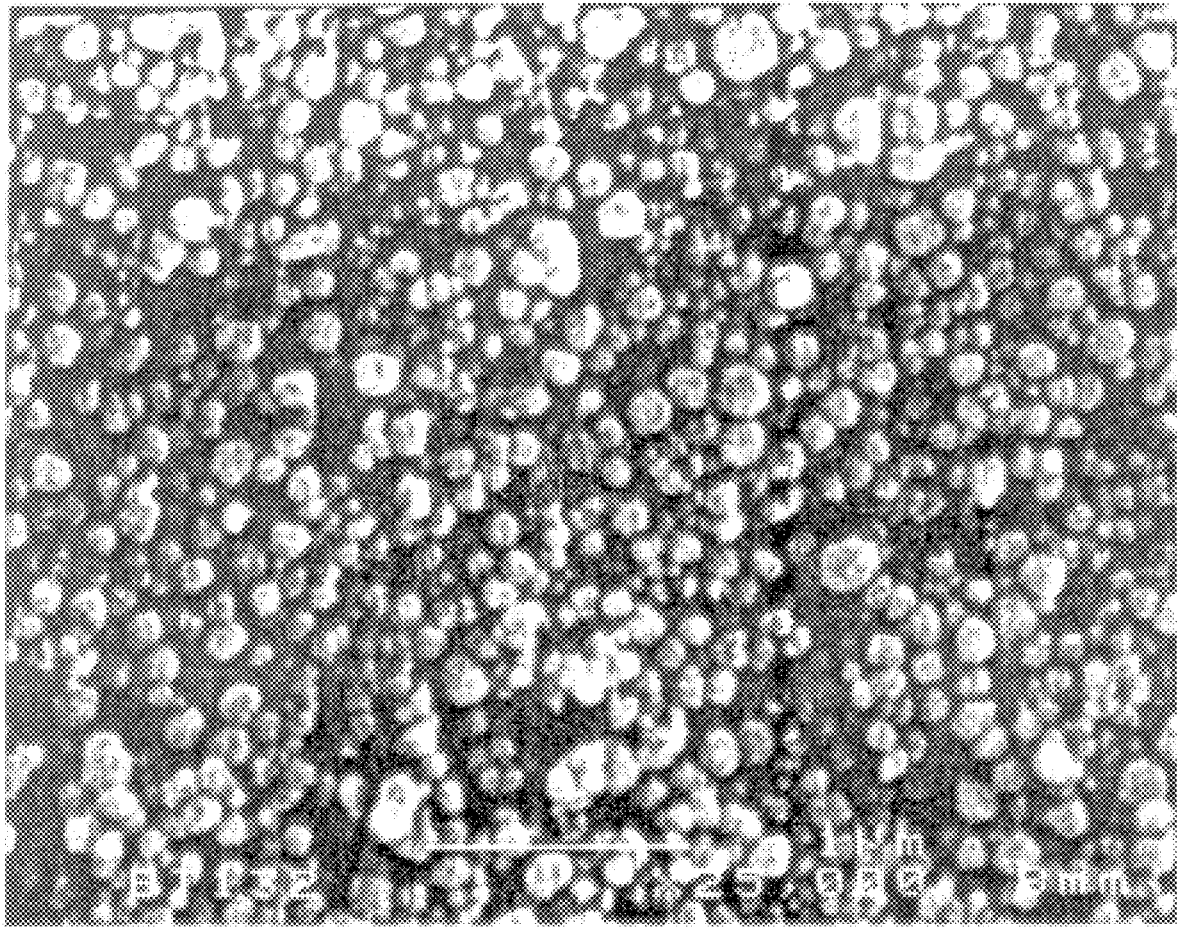
FIG. 4. SEM picture of the $BaTiO_3$ particles obtained as described in Example 11.

The so obtained solid was well crystalline, consisting of finely dispersed uniform spherical particles, yet smaller in size with an average diameter of 70 nm as shown in FIG. 4.

EXAMPLE 12
Barium titanate by the "gel-sol" process

A "gel-sol" experiment was carried out by using a 100 cm$^3$ volumetric flask as the reactor. Into this reactor, 55 cm$^3$ of a 3.5 mol dm$^{-3}$ NaOH aqueous solution was introduced and heated to 85° C. Then, 32 cm$^3$ of a BaCl$_2$+TiCl$_4$ stock solution with a molar ratio [BaCl$_2$]/[TiCl$_4$] of 1.07 was added under stirring. The entire system was placed in a water bath kept at 85° C. for an additional 13 min. The obtained dispersion was then treated as in Example 1.

Figure 5:
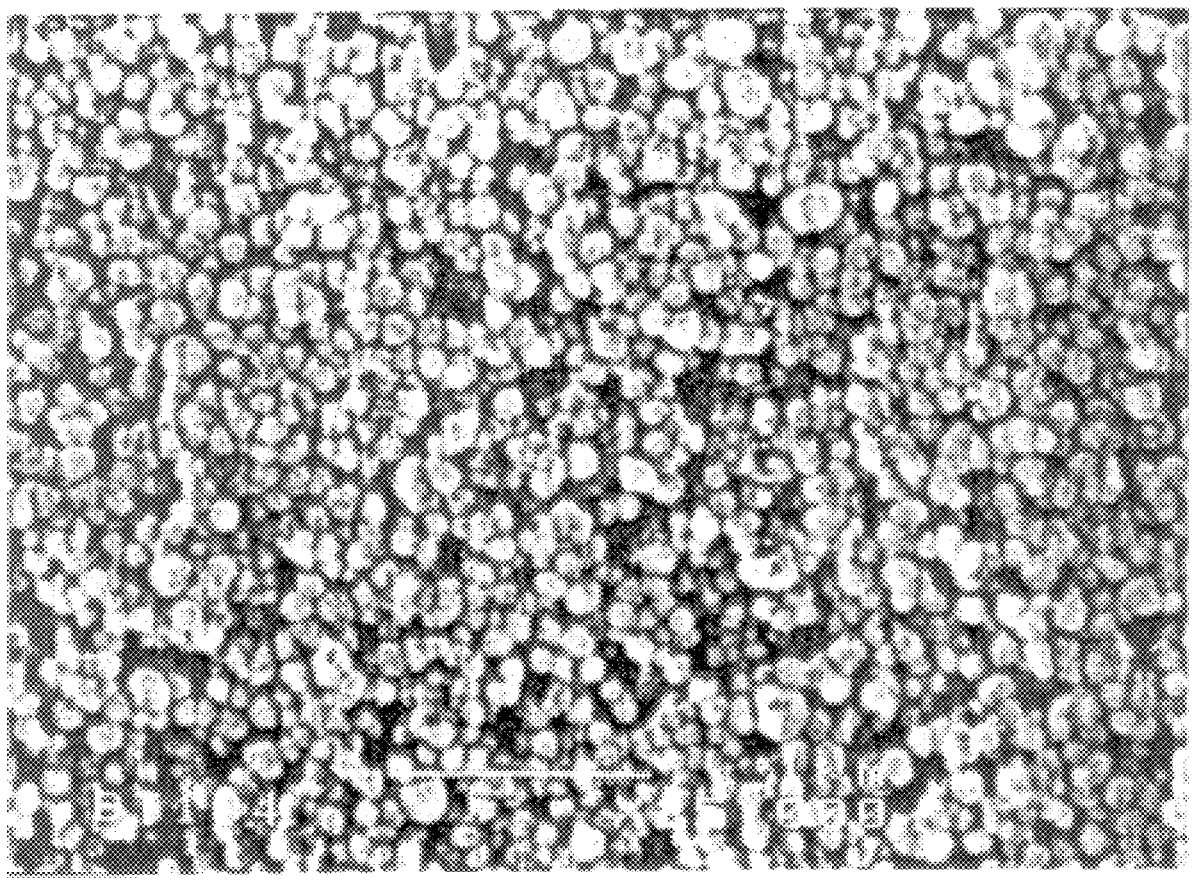
FIG. 5. SEM picture of the $BaTiO_3$ particles obtained as described in Example 12.

The obtained solids had the same characteristics as those of the powder described in Example 1, except that the particles were smaller and had an average diameter of 0.1 μm as shown in FIG. 5.

EXAMPLE 13
Barium titanate by the "gel-sol" process

In this example the effect of the concentration of NaOH on the property of BaTiO$_3$ investigated by the "gel-sol" process is illustrated. A 55 cm$^3$ NaOH solution in concentration varying from 2.0 to 3.5 mol dm$^{-3}$ was first placed in a 100 cm$^3$ volumetric flask kept in a water bath at 90° C. Then, 32 cm$^3$ of 1 mol dm$^{-3}$ BaCl$_2$+TiCl$_4$ solution with a molar ratio [BaCl$_2$]/[TiCl$_4$] of 1.12 was added into the reactor under stirring at 500 rpm. The reaction mixture was maintained at 90° C. under stirring for additional 13 min.

The resulting suspensions were treated the same as in Example 1. The particles so produced were uniform and well crystalline. The average particle size increased, from 0.08 to 0.2 μm, with decreasing NaOH concentration, from 3.5 to 2.0 mol dm$^{-3}$.

EXAMPLE 14
Strontium titanate by the CDJP process

An aqueous solution containing a mixture of SrCl$_2$ and TiCl$_4$ and a 6 mol dm$^{-3}$ NaOH solution were simultaneously introduced, at constant flow rates of 12 and 8 cm$^3$ min$^{-1}$, respectively, into a 330 cm$^3$ CDJP reactor containing 100 cm$^3$ stirred 1 mol dm$^{-3}$ NaOH solution preheated at 88° C. The temperature dropped to 83–85° C. and then was maintained constant at 85° C. The total concentration of the SrCl$_2$+TiCl$_4$ solution was 1 mol dm$^{-3}$, while the molar ratio [SrCl$_2$]/[TiCl$_4$] was kept at 1.07. The introduction of the SrCl$_2$+TiCl$_4$ and NaOH solutions lasted 8 min. subsequently followed by aging at 85° C. under stirring for 3 min.

The resulting suspension was treated the same as in Example 1. The so obtained SrTiO$_3$ particles are rather uniform spheres of good crystallinity.

EXAMPLE 15
Zirconium doped barium titanate by the CDJP process

To prepare Zr doped BaTiO$_3$, a reactant solution containing 0.517 mol dm$^{-3}$ BaCl$_2$, 0.386 mol dm$^{-3}$ TiCl$_4$, and 0.097 mol dm$^{-3}$ ZrCl$_4$ (which corresponded to a molar ratio [BaCl$_2$]/([TiCl$_4$]+[ZrCl$_4$]) of 1.07 and [TiCl$_4$]/[ZrCl$_4$]=4) was used.

A 6 mol dm$^{-3}$ NaOH solution was used to maintain the pH of the reaction mixture at 14. The flow rates of the BaCl$_2$+TiCl$_4$+ZrCl$_4$ and NaOH stock solutions were 12 and 8 cm$^3$ min$^{-1}$, respectively. The other experimental procedures were the same as described in Example 1.

Figure 6:
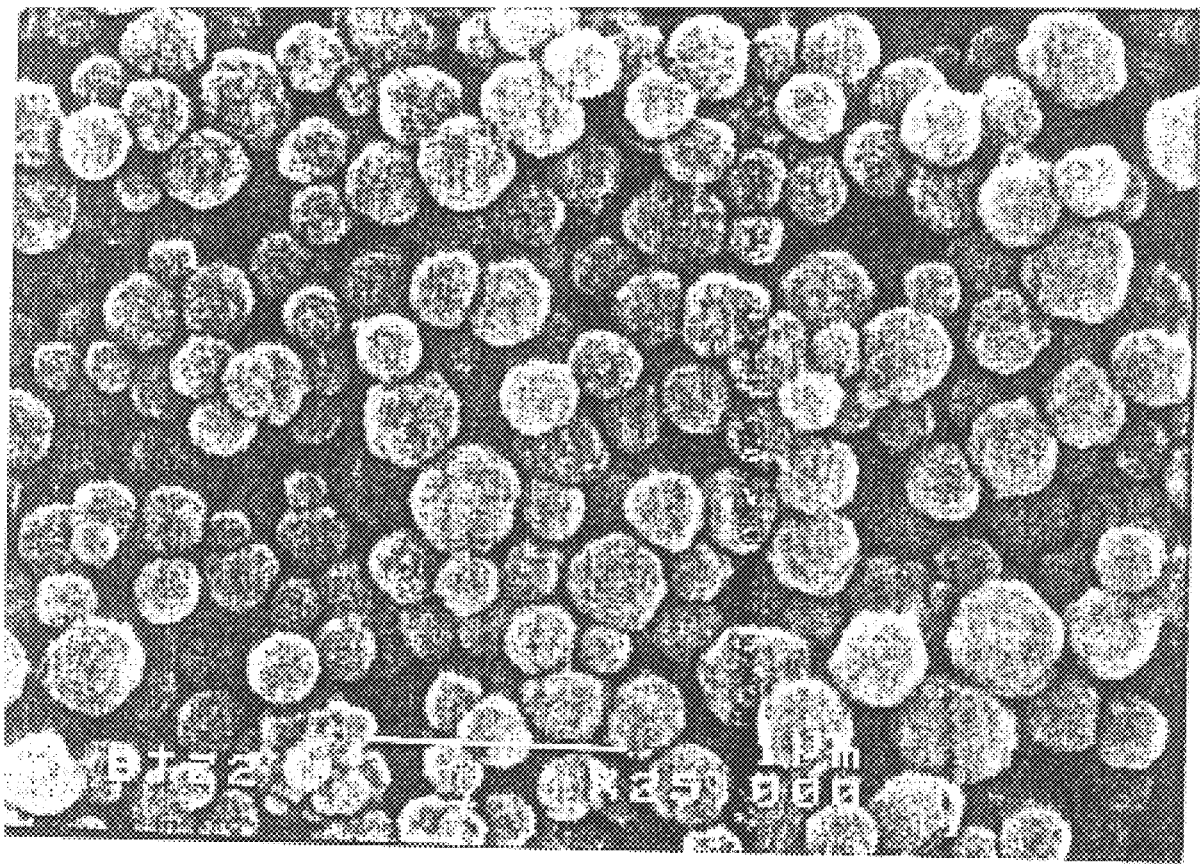
FIG. 6. SEM picture of the Zr-doped $BaTiO_3$ particles obtained as-described in Example 15.

The so prepared Zr-doped BaTiO$_3$ particles appeared to be spherical, uniform in size, and well crystalline as depicted in FIG. 6 with an average diameter of 0.2 μm. The XRD pattern indicates a change in the crystal lattice due to the incorporation of Zr. The results from chemical analysis showed the incorporation of Zr to be quantitative with a molar ratio [Ti]/[Zr] of 4, corresponding to a Zr doping content of 20% in the solid.

EXAMPLE 16
Zirconium doped barium titanate by the CDJP process

This example illustrates the preparation of Zr-doped BaTiO$_3$ with different dopant contents.

Experiments were carried out using the same experimental conditions as in Example 15, except that the reactants concentrations in the BaCl$_2$+TiCl$_4$+ZrCl$_4$ stock solution varied according to:

| Zr dopant content | Concentration of the reactants (mol dm$^{-3}$) | | |
|---|---|---|---|
| solid (%) | BaCl$_2$ | TiCl$_4$ | ZrCl$_4$ |
| 10 | 0.517 | 0.048 | 0.435 |
| 17 | 0.517 | 0.072 | 0.411 |
| 24 | 0.517 | 0.116 | 0.367 |
| 30 | 0.517 | 0.145 | 0.338 |

The so obtained powders consisted of well crystalline, uniform spherical particles, similar to those obtained in Example 15.

EXAMPLE 16A

Example 16 was repeated by changing the concentrations prepare a 20% Zr-doped BaTiO$_3$.

The dielectric data of the 20% Zr-doped BaTiO$_3$ powder, sintered at 1275° C. showed that the Curie temperature is shifted to 50° C. (compared with FIG. 3) and the curve is broad enough to meet the requirements for Y5V-capacitor application.

EXAMPLE 17
Strontium doped barium titanate by the CDJP process

This example illustrates the preparation of Sr doped barium titanate particles.

For this purpose, the experimental conditions are the same as in Example 15, except that the reactants in the stock solution had the following concentrations:

| Sr dopant content in | Concentration of the reactants (mol dm$^{-3}$) | | |
|---|---|---|---|
| solid (%) | BaCl$_2$ | SrCl$_2$ | TiCl$_4$ |
| 10 | 0.465 | 0.052 | 0.483 |
| 20 | 0.414 | 0.103 | 0.483 |
| 30 | 0.362 | 0.155 | 0.483 |

The so prepared Sr-doped particles were substantially spherical and well crystalline, similar to those of Example 15.

Figure 9:
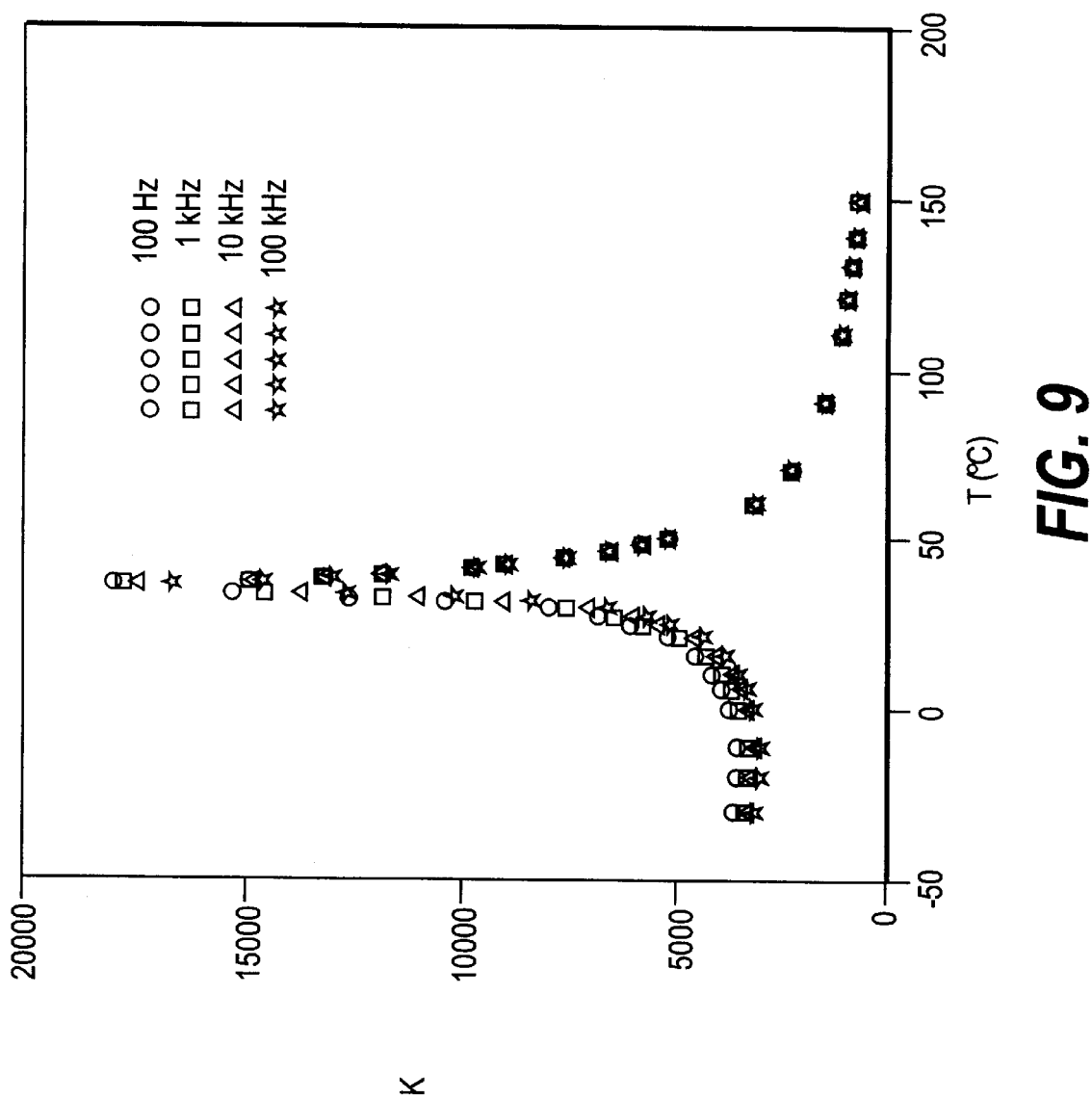
FIG. 9. The plot as in FIG. 3 for Example 17.

In FIG. 9 it is reported the curve of dielectric constant vs. temperature of the powders doped with 30% by weight of Sr when sintered at 1300° C. The Curie temperature is shifted to 37° C. compared to FIG. 3. The curve is very sharp and this powder can be used for thermal sensor applications.

EXAMPLE 18
Calcium doped barium titanate by the CDJP process

This example illustrates the preparation of Ca doped barium titanate particles. For this purpose, the experimental conditions were the same as in Example 15, except that the reactants in the stock solution had the following concentrations:

| Ca dopant content in | Concentration of the reactants (mol dm$^{-3}$) | | |
|---|---|---|---|
| solid (%) | BaCl$_2$ | CaCl$_2$ | TiCl$_4$ |
| 10 | 0.465 | 0.052 | 0.483 |
| 20 | 0.414 | 0.103 | 0.483 |
| 30 | 0.362 | 0.155 | 0.483 |

The so prepared Ca-doped particles were substantially spherical and well crystalline, similar to those of Example 15.

EXAMPLE 19
Calcium and Zirconium doped barium titanate by the CDJP process

The experimental conditions were the same as in Example 15, except that the reactant solution contained 0.507 mol dm$^{-3}$ BaCl$_2$, 0.010 mol dm$^{-3}$ CaCl$_2$, 0.386 mol dm$^{-3}$ TiCl$_4$ and 0.097 mol dm$^{-3}$ ZrCl$_4$, which corresponded to molar ratios ([BaCl$_2$]+[CaCl$_2$])/([TiCl$_4$]+[ZrCl$_4$]), [BaCl$_2$]/[CaCl$_2$], and [TiCl$_4$]/[ZrCl$_4$] of 1.07, 49 and 4, respectively.

The so obtained mixed Ca and Zr doped BaTiO$_3$ particles were substantially spherical and well crystalline.

EXAMPLE 19A

Example 19 was repeated by changing the concentration of CaCl$_2$ into 0.0052 mol dm$^{-3}$, to obtain BaTiO$_3$ doped with 1% Ca and 20% Zr.

The dielectric data showed that the curve is broad enough to meet the characteristics of Z5U-capacitor when sintered at 1300° C.

EXAMPLE 20
Lithium niobate by the "gel-sol" process

This example demonstrates the preparation of lithium niobate, LiNbO$_3$, particles by the "gel-sol" technique.

First, 50 cm$^3$ of a 1.5 mol dm$^{-3}$ LiOH solution was placed in a 100 cm$^3$ volumetric flask and preheated to 95° C. Then, 30 cm$^3$ of a mixed LiCl+NbCl$_5$ stock solution, containing 0.48 mol dm$^{-3}$ NbCl$_5$, 0.52 mol dm$^{-3}$ LiCl, and 0.12 mol dm$^{-3}$ H$_2$O$_2$, was added into the reactor under stirring. To maintain the reaction temperature, the reactor was placed in a water bath kept at 95° C. The reaction time was 30 min.

Figure 7:
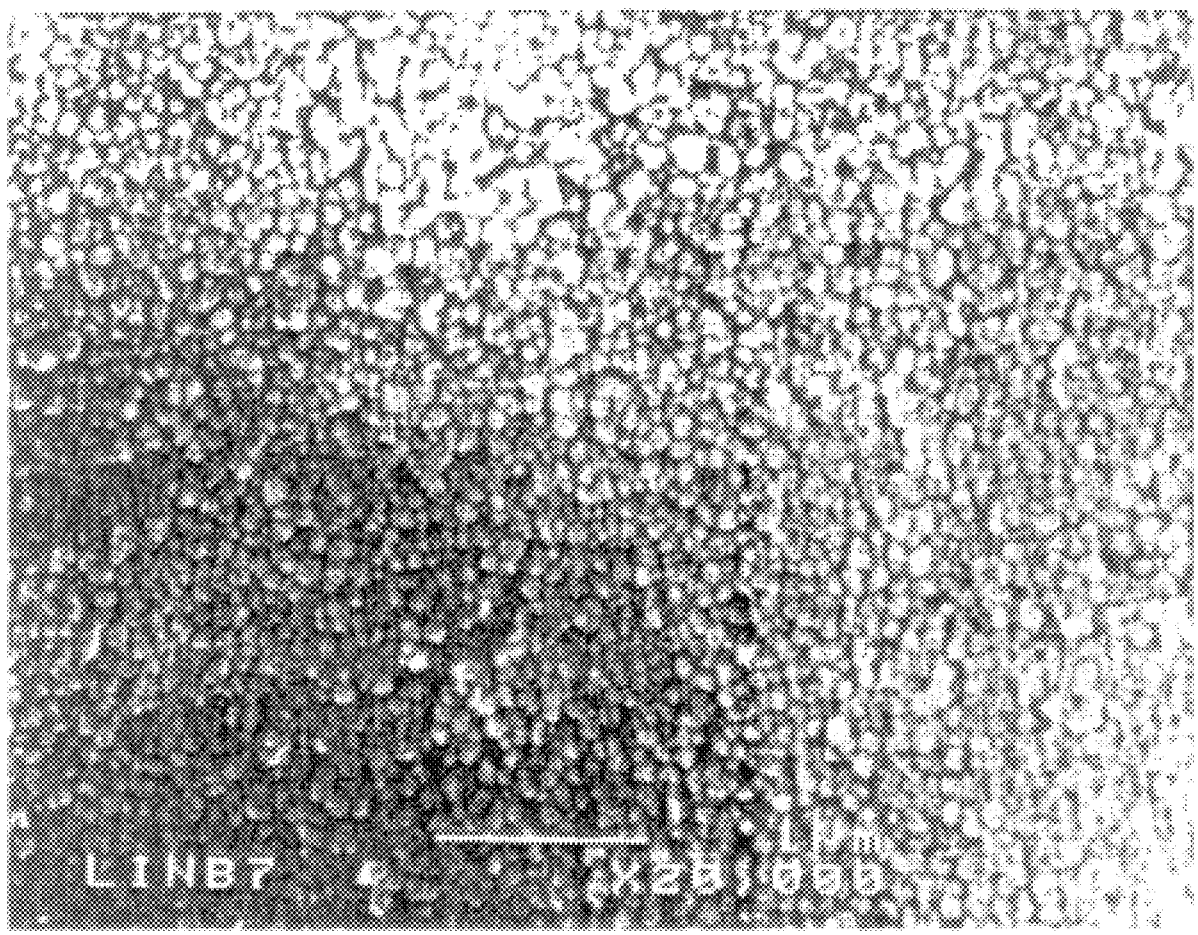
FIG. 7. SEM picture of the $LiNbO_3$ particles obtained by "gel-sol" technique as described in Example 20.

The so prepared particles were washed once with boiling water and once with cooled water and dried at 100° C. The SEM picture of this powder (FIG. 7) shows the particles to be well dispersed, uniform in size and shape, and nanosized with an average size of 60 nm. The XRD pattern proves the particles to be crystalline lithium niobate, LiNbO$_3$.

EXAMPLE 21
Sodium and potassium niobates by the "gel-sol" process

Example 20 was repeated, but NaCl (or KCl) instead of LiCl was used as reactant, and NaOH (or KOH) instead of LiOH was used in the base solution with all other experimental conditions being the same. The so obtained powder was treated as in Example 20. In both cases, nanosized crystalline $NaNbO_3$ and $KNbO_3$ particles of uniform size and shape were obtained.

EXAMPLE 22
Potassium niobate by the CDJP process

An aqueous solution containing 0.20 mol $dm^{-3}$ KCL, 0.185 mol $dm^{-3}$ $NbCl_5$ and 0.04 mol $dm^{-3}$ $H_2O_2$ and a separate 6 mol $dm^{-3}$ KOH solution were simultaneously introduced, at constant flow rates under stirring into a 300 $cm^3$ reactor containing 1 mol $dm^{-3}$ KOH solution preheated at 90° C. The flow rates of the $KCl+NbCl_5+H_2O_2$ and KOH stock solution were 12 and 8 $cm^3$ $min^{-1}$, respectively. The reaction time was 8 min followed by 5 min of aging at 90° C.

The resulting dispersion was treated the same as in Example 20. The so obtained particles are uniform, spherical, nanoscaled in size with an average diameter of 17 nm. The XRD pattern shows that the particles to be crystalline potassium niobate, $KNbO_3$.

EXAMPLE 23
Sr-doped barium titanate by the CTJP technique (method (a) of the description)

The solutions are the following: (1) a 6 mol $dm^{-3}$ NaOH solution, (2) a solution containing $BaCl_2$ and $TiCl_4$, and (3) a solution containing $TiCl_4$ and $SrCl_2$. The total concentrations of $[BaCl_2]+[TiCl_4]$ and $[SrCl_2]+[TiCl_4]$ are both, 1.0 mol $dm^{-3}$ and the molar ratios $[BaCl_2]/[TiCl_4]$ and $[SrCl_2]/[TiCl_4]$ are both, 1.07. The reaction temperature is 85° C. These three solutions were introduced as follows: (a) all three are introduced simultaneously by jets at constant flow rates for 8 min., followed by aging for 5 min.

The apparatus is the one of Example 15.

According to the CTJP technique (a) described above, solutions 1, 2, and 3 are introduced into the reactor simultaneously at constant flow rates of 8, 9.6 and 2.4 $cm^3$ $min^{-1}$, respectively, for 8 min., followed by aging for 5 min. This system corresponds to 20% Sr-doped barium titanate. Uniform spherical particles of good single-phase crystallinity were produced, similar to those obtained using the CDJP technique.

EXAMPLE 24
Sr-doped barium titanate by the CTJP technique (method (b) of the description)

The solutions (1), (2), (3) are the same as in Example 23; and the reactor is the same, but the introduction of solutions into the reactor is the following (method b): combinations of two are added at a given time in sequence, i.e., first solutions (1) (NaOH) and (2) are introduced simultaneously at constant flow rates for a desired period of time, aged for 5 min., followed by simultaneous introduction of solutions (1) (NaOH) and (3) for some time, and finally aged for 5 min.

According to the CTJP technique (b), solutions (1) and (2) are introduced into the reactor simultaneously at constant flow rates of 8 and 12 $cm^3$ $min^{-1}$, respectively, for 5 min., and aged for 5 min. Then, the solutions (1) and (3) are subsequently introduced at constant flow rates of 8 and 12 $cm^3$ $min^{-1}$, respectively, for 1, 2, 3, or 4 min., followed by aging for 5 min. The resulting dispersions contain spheres of good crystallinity but bimodal distributions, which are mixtures of $BaTiO_3$ and $SrTiO_3$ according to the XRD patterns.

EXAMPLE 25
Sr-doped barium titanate by the CTJP technique (Method (c) of the description)

The solutions (1), (2), (3) are the same as in Example 23 and the apparatus for the reaction is the same. Method (c) is the same procedure as in (b) of Example 24 except first are introduced solutions (1) and (3) followed by solutions (1) and (2). The specific examples using the CTJP technique are given as follows:

According to the CTJP technique (c), the solutions (1) and (3) are introduced into the reactor, at constant flow rates of 8 and 12 $cm^3$ $min^{-1}$, respectively, for 1, 2, 3 or 4 min., followed by aging for 5 min. Then, the solutions (1) and (2) are subsequently introduced simultaneously at constant flow rates of 8 and 12 $cm^3$ $min^{-1}$, respectively, for 5 min., followed by aging for 5 min. The powders so obtained contain mixtures of crystalline $BaTiO_3$ and $SrTiO_3$ of bimodal distributions.

The dielectric data of the powder so obtained, sintered at 1250° C., showed that the Curie temperature is shifted to 20° C., with respect to FIG. 3 of Example 1. The curve is broad enough to meet the requirements for Y5V-capacitor application.

EXAMPLE 26
Zr-doped barium titanate by the CDJP process

Example 15 in the patent application was repeated using the same experimental procedures and conditions, except the molar ratio $[BaCl_2]/([TiCl_4]+[ZrCl_4])=1.103$. The corresponding concentrations of $BaCl_2$, $TiCl_4$, and $ZrCl_4$ in the reactant solution were 0.525, 0.380 and 0.095 mol $dm^{-3}$, respectively.

The resulting powder was sintered at 1275° C. for 2 h.

The curve of dielectric constant vs temperature of the sintered powder meets the specification of Y5V-MLC capacitor application.

EXAMPLE 27
Zr-doped barium titanate by the CDJP process

The same powder described in Example 26 was sintered at 1300° C. for 2 h.

The curve of dielectric constant vs temperature of the sintered powder is sharper than that of FIG. 9 and is good for thermal sensor application.

EXAMPLE 28
Sr and Zr-doped barium titanate by the CDJP process

Example 15 in the patent application was repeated using the same procedure and conditions, except that the reactant solution contained $SrCl_2$ besides $BaCl_2$, $TiCl_4$, and $ZrCl_4$ and the molar ratios $([BaCl_2]+[SrCl_2])/([TiCl_4]+[ZrCl_4])=1.077$, $[SrCl_2]/([BaCl_2]+[SrCl_2])=0.05$ and $[ZrCl_4]/([TiCl_4]+[ZrCl_4])=0.15$. The corresponding concentrations of $BaCl_2$, $SrCl_2$, $TiCl_4$, and $ZrCl_4$ in the reactant solution were 0.493, 0.026, 0.409 and 0.072 mol $dm^{-3}$, respectively.

The resulting powder was sintered at 1350° C. for 2 h.

The curve of dielectric constant vs temperature of the sintered powder is sharper than that of FIG. 9 and is good for thermal sensor application.

EXAMPLE 29
Barium titanate by the gel-sol process

The apparatus for the continuous precipitation of barium titanate powders comprises a chemical reservoir 1 containing a 3.0 mol $dm^{-3}$ NaOH solution, a reservoir 2 containing a solution mixture of $BaCl_2$ and $TiCl_4$ with a total concentration of the chlorides of 1.0 mol $dm^{-3}$ and a molar ratio $[BaCl_2]/[TiCl_4]$ of 1.10, and a static mixer tubular reactor, 1.43 cm in I.D. and 13.8 m long, formed into a coil and inserted into a cylindrical constant temperature water bath, kept at 85° C. The solutions in reservoirs 1 and 2 were brought into contact before entering the tubular reactor. The flow rates of the chloride solution and the NaOH solution (which had passed through a heated oil bath to preheat 85° C.) were controlled at a given ratio by individual peristaltic pumps, in order to achieve the concentrations and temperature required for precipitation process.

The ratio of the flow rates of NaOH solution vs $BaCl_2$-$TiCl_4$ solution was controlled at 7/4 in all experiments, while the total flow rate through the tubular reactor was varied.

In one experiment (a) the total flow rate of NaOH solution+($BaCl_2$+$TiCl_4$) solution was 120 $cm^3$ $min^{-1}$, corresponding to a mean residence time of 15 min.

In experiment (b) a total flow rate of reactant solutions was 240 $cm^3$ $min^{-1}$ corresponding to a mean residence time of 7.5 min.

In experiment (c) the total flow rate of reactant solutions was 360 $cm^3$ $min^{-1}$, corresponding to a mean residence time of 5 min.

The powders obtained at different reaction times in the reactor, according to experiments (a), (b) and (c) have the same particle size and morphological characteristics as the powder produced by the batch technique of Example 12.

We claim:

1. A process for the preparation of crystalline perovskite powders of the general formula $A_x(BO_3)_y$, wherein cation A is at least one metal selected from the group consisting of $Li^+$, $Na^+$, $K^+$, $Mg^{2+}$, $Ca^{2+}$, $Sr^{2+}$, $Ba^{2+}$, and $La^{3+}$, and B in the anion ($BO_3$) is at least one metal selected from the group consisting of $Ti^{4+}$, $Zr^{4+}$, $Sn^{4+}$, $Hf^{4+}$, $Nb^{5+}$, and $Ta^{5+}$, x is equal to the valence of the anion ($BO_3$), and y is equal to the valence of the cation A, the general formula of the crystalline perovskite powders having an A/B molar ratio value, said process comprising:

separately and simultaneously injecting two solutions into a reactor containing a stirred aqueous base solution having a pH of about 14 and preheated to 70–100° C., one of said two solutions being an aqueous solution (I) containing salts or organometallic compounds of at least one metal A as defined above and of at least one metal B as defined above, the molar ratio A/B in the salts or organometallic compounds being approximately equal to the value of the ratio A/B of the general formula of the crystalline perovskite powders, and the other of said two solutions being an aqueous basic solution (II) containing a base in an amount from 0.4 to 6 mol/$dm^3$; and maintaining the flow rate of solution (I) constant and injecting the base solution (II) to form a reaction mixture, the base solution (II) being injected at a flow rate sufficient to maintain the pH of the reaction mixture constant at about 14 while the process is performed at 70° C.–100° C. with a reaction time of 30 minutes or less, said flow rates of solutions (I) and (II) varying from 5 to 40 $cm^3$/min, thereby causing crystalline perovskite powders to precipitate.

2. A process according to claim 1, in which the total concentration of metal ions in solution (I) ranges from 0.1 to 2.0 mol $dm^{-3}$, the molar ratio of A/B ranges from 0.8 to 1.2 and the base concentration in solution (II) ranges from 0.4 to 6 mol $dm^{-3}$.

3. A process according to claim 1, in which the salts are selected from halides, nitrates, acetates, perchlorates, oxalates and alkoxides and the base is selected from alkaline or alkaline-earth metal hydroxides and ammonium hydroxide.

4. A process according to claim 1, in which the salts are chlorides and the base is NaOH or KOH.

5. A process according to claim 1, in which A is selected from $Li^+$, $Na^+$, $K^+$, $Mg^{2+}$, $Ca^{2+}$, $Sr^{2+}$ and $Ba^{2+}$ optionally substituted with from 0 to 50% of at least one dopant D of the group $Ca^{2+}$, $Mg^{2+}$, $Sr^{2+}$ and $La^{3+}$ and B is selected from $Ti^{4+}$, and $Nb^{5+}$ optionally substituted with at least one dopant D' of the group $Zr^{4+}$, $Sn^{4+}$, $Hf^{4+}$, $Nb^{5+}$ and $Ta^{5+}$, with the condition that D is different from A, and D' is different from B.

6. A process according to claim 1 in which besides solutions (I) and (II) there is used a solution (III) containing a salt of the same element B contained in solution (I) and a salt of a dopant D or a salt of the same element A contained in solution (I) and a salt of a dopant D', D being selected from $Ca^{2+}$, $Mg^{2+}$, $Sr^{2+}$ and $La^{3+}$, D' being selected from $Zr^{4+}$, $Sn^{4+}$, $Hf^{4+}$, $Nb^{5+}$, and $Ta^{5+}$, D being different from A and D' being different from B, wherein solutions I, II, and III are simultaneously injected into a reactor or a combination of two of the said solutions are injected into a reactor followed by a simultaneous injection of a second combination of two of the said solutions.

7. A process according to claim 2 in which the total concentration of metal ions in solution (I) ranges from 0.5 to 1.2 mol/$dm^3$.

8. A process according to claim 1 wherein the powders consist essentially of spherical primary particles having an average size from 0.15 to 0.4 micrometers.

* * * * *